(12) United States Patent
Datchanamoorthy et al.

(10) Patent No.: US 9,476,318 B2
(45) Date of Patent: Oct. 25, 2016

(54) SYSTEMS AND METHODS TO MONITOR A ROTATING COMPONENT

(71) Applicant: GENERAL ELECTRIC COMPANY, Schenectady, NY (US)

(72) Inventors: Senthilkumar Datchanamoorthy, Bangalore (IN); Michael Allen Ball, Mount Juliet, TN (US); Aninda Bhattacharya, Bangalore (IN); Venkata Ramana Murthy Hemadribhotla, Bangalore (IN)

(73) Assignee: General Electric Company, Niskayuna, NY (US)

( * ) Notice: Subject to any disclaimer, the term of this patent is extended or adjusted under 35 U.S.C. 154(b) by 504 days.

(21) Appl. No.: 14/016,930

(22) Filed: Sep. 3, 2013

(65) Prior Publication Data

US 2015/0066389 A1 Mar. 5, 2015

(51) Int. Cl.
| | | |
|---|---|---|
| *F01D 21/00* | (2006.01) | |
| *G01B 7/14* | (2006.01) | |
| *G01M 15/14* | (2006.01) | |
| *G01B 21/16* | (2006.01) | |
| *F01D 11/14* | (2006.01) | |

(52) U.S. Cl.
CPC .............. *F01D 21/003* (2013.01); *G01B 7/14* (2013.01); *G01M 15/14* (2013.01); *F01D 11/14* (2013.01); *G01B 21/16* (2013.01)

(58) Field of Classification Search
CPC .... G01M 15/14; F01D 21/003; F01D 11/14; G01B 7/14; G01B 21/16; G01B 5/6005; G11B 5/6064
USPC .......... 702/35, 155, 150, 117, 118, 182–185; 360/75
See application file for complete search history.

(56) References Cited

U.S. PATENT DOCUMENTS

| | | | |
|---|---|---|---|
| 4,730,979 A | 3/1988 | Hook | |
| 4,876,505 A | 10/1989 | Osborne | |
| 4,987,555 A | 1/1991 | Twerdochlib | |
| 5,101,165 A * | 3/1992 | Rickards | G01B 7/14 324/662 |
| 5,166,626 A | 11/1992 | Hester et al. | |
| 5,432,339 A * | 7/1995 | Gordon | G01D 5/24452 250/231.13 |
| 5,689,756 A * | 11/1997 | Taki | G03G 15/1655 399/33 |
| 5,942,893 A | 8/1999 | Terpay | |

(Continued)

FOREIGN PATENT DOCUMENTS

GB 2245070 A 12/1991

OTHER PUBLICATIONS

Venkata Ramana Murthy Hemadribhotla et al. ; "Tip Shroud Monitoring System, Method, and Controller"; Pending U.S. Appl. No. 13/708,588, filed Dec. 7, 2012; 36 Pages.

*Primary Examiner* — Carol S Tsai
(74) *Attorney, Agent, or Firm* — Ann M. Agosti (57) ABSTRACT

A method is presented. The method includes selecting a first window of signals and a second window of signals from clearance signals representative of clearances between a rotating component and a stationary casing surrounding the rotating component, determining a first signed average power value corresponding to the first window of signals, and a second signed average power value corresponding to the second window of signals, determining a resultant value based upon the first signed average power value and the second signed average power value, and determining one or more defects or potential defects in the rotating component based upon the resultant value.

21 Claims, 7 Drawing Sheets

(56) References Cited

U.S. PATENT DOCUMENTS

| | | | |
|---|---|---|---|
| 6,490,808 B1 * | 12/2002 | Roux | G01B 7/14 33/392 |
| 7,215,129 B1 * | 5/2007 | Andarawis | F01D 21/003 324/661 |
| 7,332,915 B2 * | 2/2008 | Andarawis | G01B 7/14 324/662 |
| 7,333,913 B2 * | 2/2008 | Andarawis | G01B 7/144 702/158 |
| 7,337,679 B2 * | 3/2008 | Hattori | G01D 11/245 324/207.25 |
| 7,341,426 B2 | 3/2008 | Schwarz et al. | |
| 7,554,324 B2 * | 6/2009 | Gualtieri | F01D 17/02 324/207.16 |
| 7,722,310 B2 * | 5/2010 | Balasubramaniam | G01B 7/14 324/545 |
| 7,852,594 B2 * | 12/2010 | Maeda | G11B 5/6005 360/75 |
| 8,022,715 B2 * | 9/2011 | Andarawis | F01D 11/14 324/644 |
| 8,082,763 B2 * | 12/2011 | Giordano | D06F 37/203 68/12.04 |
| 8,121,813 B2 * | 2/2012 | Ren | G01B 7/14 702/155 |
| 8,177,483 B2 | 5/2012 | McCallum | |
| 8,272,246 B2 | 9/2012 | Andarawis et al. | |
| 8,696,434 B2 * | 4/2014 | Tsukahara | G07F 17/3213 463/16 |
| 8,970,228 B2 * | 3/2015 | Andarawis | G01B 7/14 324/658 |
| 2003/0222640 A1 | 12/2003 | Twerdochlib et al. | |
| 2006/0239813 A1 * | 10/2006 | Shah | F01D 11/08 415/119 |
| 2007/0005294 A1 * | 1/2007 | Andarawis | G01B 7/144 702/155 |
| 2008/0264111 A1 * | 10/2008 | Giordano | D06F 37/203 68/12.04 |
| 2010/0077830 A1 * | 4/2010 | Andarawis | G01B 21/042 73/1.79 |
| 2010/0191502 A1 * | 7/2010 | Ren | G01B 7/14 702/155 |
| 2010/0303612 A1 | 12/2010 | Bhatnagar et al. | |
| 2011/0231171 A1 * | 9/2011 | Jousselin | G01H 1/006 703/7 |
| 2012/0092179 A1 | 4/2012 | Pg et al. | |
| 2013/0321000 A1 * | 12/2013 | Andarawis | G01B 7/14 324/658 |
| 2014/0014052 A1 * | 1/2014 | Tadokoro | F01L 1/344 123/90.15 |

* cited by examiner

SYSTEMS AND METHODS TO MONITOR A ROTATING COMPONENT

BACKGROUND

Rotating machinery, such as gas and steam turbines, are used in many applications. Typically, gas turbines and steam turbines include rotors. A rotor includes a plurality of blades and a shaft. In some examples, the movement of a fluid may induce rotation of the plurality of blades resulting in rotation of the shaft. Alternatively, rotation of the shaft may induce rotation of the plurality of blades resulting in movement of the fluid.

Typically a rotor of a turbine in a turbine engine includes a shroud assembly formed out of mutually engaged shrouds. A typical shroud is a block or a plate that is formed and/or mounted on a tip of a blade, and is configured to mutually engage with a substantially identical shroud mounted on an adjacent blade. Multiple shrouds mounted on the tips of a plurality of blades mutually engage with one another to form an annular rotating component around the plurality of blades. The annular rotating component in one example is the shroud assembly. During operation of the plurality of blades, the shroud assembly also rotates with the blades.

A portion of the shroud assembly or one or more shrouds in the shroud assembly may get damaged due to metal fatigue, or other reasons. The damage may result in gaps in the shroud assembly. For example, a piece of the shroud assembly may fall off and/or shift out of alignment, a portion of the shroud assembly may deflect in an undesirable way, and/or other types of undesirable effects may occur. While conventional systems exist to monitor clearance between the shroud assembly and an outer casing surrounding the shroud assembly, such monitoring systems do not account for damages and defects in the shroud assembly.

BRIEF DESCRIPTION

A method is presented. The method includes selecting a first window of signals and a second window of signals from clearance signals representative of clearances between a rotating component and a stationary casing surrounding the rotating component, determining a first signed average power value corresponding to the first window of signals, and a second signed average power value corresponding to the second window of signals, determining a resultant value based upon the first signed average power value and the second signed average power value, and determining one or more defects or potential defects in the rotating component based upon the resultant value.

Furthermore, another method is presented. The method includes selecting a first window of signals and a second window of signals from clearance signals representative of clearances between a rotating component and a stationary casing surrounding the rotating component, determining a first signed average power value corresponding to the first window of signals, and a second signed average power value corresponding to the second window of signals, determining a first resultant value based upon the first signed average power value and the second signed average power value, iteratively shifting the first window of signals and the second window of signals to determine subsequent first signed average power values and subsequent second signed average power values, determining a plurality of subsequent resultant values based upon the subsequent first signed average power values and the subsequent second signed average power values, generating a resultant value signal based upon the first resultant value and the plurality of subsequent resultant values, and determining one or more defects or potential defects in the rotating component based upon the resultant value signal.

A system is presented. The system includes a processing subsystem that selects a first window of signals and a second window of signals from clearance signals representative of clearances between a rotating component and a stationary casing surrounding the rotating component, determine a first signed average power value corresponding to the first window of signals, and a second signed average power value corresponding to the second window of signals, determine a resultant value based upon the first signed average power value and the second signed average power value, and determine one or more defects or potential defects in the rotating component based upon the resultant value.

DRAWINGS

These and other features and aspects of embodiments of the present invention will become better understood when the following detailed description is read with reference to the accompanying drawings in which like characters represent like parts throughout the drawings, wherein:

FIG. 4($a$) is a graphical representation of a simulated signal representative of clearances between a shroud assembly and a stationary casing surrounding the shroud assembly;

FIG. 4($b$) is a graphical representation of an initial signal representative of clearances between a shroud assembly and a stationary casing surrounding the shroud assembly;

FIG. 4($c$) is a graphical representation of a secondary signal representative of clearances between a shroud assembly and a stationary casing surrounding the shroud assembly;

FIG. 4($d$) is a graphical representation of a resultant value signal; and

FIG. 5($a$) and FIG. 5($b$) is a flow chart that illustrates an exemplary method for determination of one or more defects in a rotating component, in accordance with one embodiment of the present techniques.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. As used herein, the term "and/or" includes any and all combinations of one or more of the associated listed items.

Approximating language, as used herein throughout the specification and claims, may be applied to modify any quantitative representation that could permissibly vary without resulting in a change in the basic function to which it may be about related. Accordingly, a value modified by a term such as "about" is not limited to the precise value specified. In some instances, the approximating language may correspond to the precision of an instrument for measuring the value.

The present systems and methods determine one or more defects, potential defects in a rotating component of a turbine, and/or potential failures of the turbine. The rotating component, for example, may be a shroud assembly. As used herein, the term "shroud assembly" is used to refer to a substantially continuous annular body formed by mutually engaged blocks or plates, wherein the blocks or plates are mounted on the tips of blades or buckets of a rotor. For example, each blade tip may bear a block or a plate configured to engage and/or interlock with adjacent, substantially identical blocks or plates of adjacent blades. The engaged and/or interlocked blocks or plates typically form an uneven external surface of the shroud assembly.

As used herein, the term "rotor" means a component of a machine configured to rotate relative to another component of the machine. For example, a rotor may include a plurality of blades or buckets mounted on a hub or a shaft. Each blade has an airfoil cross-section, and the hub or shaft is mounted for rotation relative to a housing or another part of a machine in which the rotor is used, as might be found in a turbo machine. Fluid passing over the blades may induce rotation of the hub or shaft, and rotation of the hub or shaft may induce motion and/or compression and/or expansion of a fluid in which the blades are immersed.

As described in detail hereinafter, the present systems and methods provide a monitoring system that monitors a rotating component to detect one or more defects or potential defects in the rotating component. The monitoring in one example establishes thresholds for the clearance signals and can assess whether the rotating components are due for maintenance before a failure. As used herein, monitoring for defects refers to processing to monitor the health of the rotating components, detecting defects and predicting potential failures via prognostics. The monitoring system, for example, may include one or more sensors that generate clearance signals representative of clearances between the rotating component and a stationary casing surrounding the rotating component. The rotating component, for example, is a shroud assembly. The clearance signals are received and processed by a processing subsystem to determine one or more defects or potential defects in the rotating component. The processing subsystem determines a dynamic threshold based upon the clearance signals. Furthermore, the processing subsystem determines the one or more defects or the potential defects in the rotating component based upon the dynamic threshold and the clearance signals.

Figure 1:
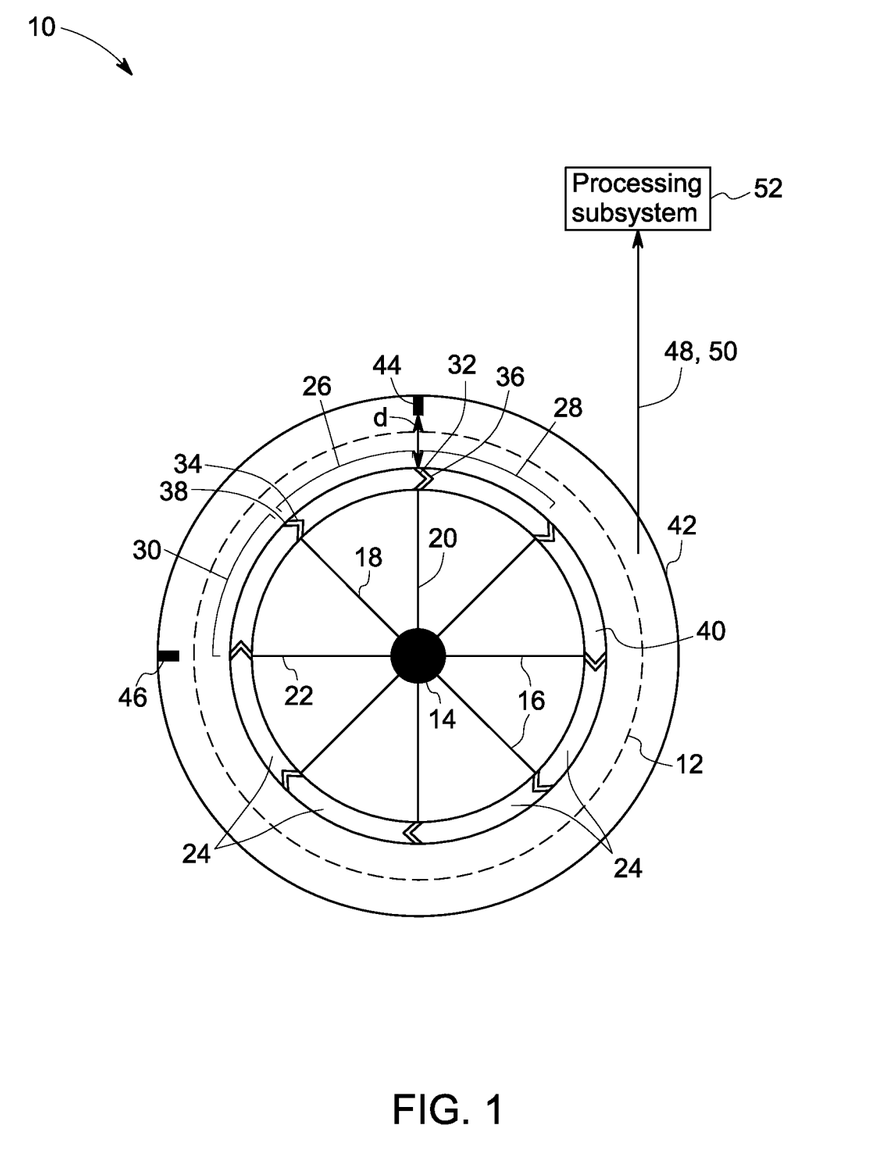
FIG. 1 is a diagrammatic illustration of a system to monitor one or more defects or potential defects in a rotating component, in accordance with one embodiment of the present techniques.

FIG. 1 is a diagrammatic illustration of a system 10 to monitor one or more defects, potential defects in a rotating component, or system failures, in accordance with one embodiment of the present techniques. The system 10 includes a rotor 12. In the presently contemplated configuration, the rotor 12 is a component of a turbine (not shown) in a gas turbine (not shown). It is noted that while FIG. 1 shall be explained with reference to the rotor 12 that is a component of the turbine (not shown), the presently contemplated embodiments should not be restricted to the turbine.

As shown in FIG. 1, the rotor 12 includes a shaft 14 and a plurality of blades or buckets 16 (hereinafter referred to as blade/s). It is noted that while in this embodiment, the rotor 12 shown to include eight blades 16; the rotor 12 may include any number of blades. The blades 16 are mounted on the shaft 14. As shown in FIG. 1, the blades 16 among other blades (not referred to by reference numerals) include blades 18, 20, 22. The tips of the blades 16 mount a plurality of shrouds 24. Each of the shrouds 24, for example, may be a block or a plate mounted on the tip of a respective blade in the blades 16. In the presently contemplated configuration, the plurality of shrouds 24 among other shrouds (not referred to by reference numerals) include shrouds 26, 28, 30. For example, the tip of the blade 18 mounts the shroud 26, the tip of the blade 20 mounts the shroud 28, and the tip of the blade 22 mounts the shroud 30. Each of the shrouds 24 including the shrouds 26, 28, 30 has a front end and a back end. For example, the shroud 26 has a front end 32, and a back end 34.

The front end of each of the shrouds 24 including the shrouds 26, 28, 30 is configured or manufactured to engage with a back end of a substantially similar other shroud mounted on another adjacent blade in the blades 16. Similarly, the back end of each of the shrouds 24 including the shrouds 26, 28, 30 is configured or manufactured to engage with a front end of a substantially similar other shroud mounted on an adjacent blade. For example, the front end 32 of the shroud 26 is engaged with a back end 36 of the shroud 28. Similarly, the back end 34 of the shroud 26 is engaged with a front end 38 of the shroud 30. Accordingly, the shrouds 24 including the shrouds 26, 28, 30 mutually engage to form a shroud assembly 40.

As shown in FIG. 1, the shroud assembly 40 is an annular body formed by the mutually engaged shrouds 24 including the shrouds 26, 28, 30. In operation, the shroud assembly 40 rotates with the blades 16. Therefore, in the presently contemplated configuration the shroud assembly 40 is a rotating component 40. However, the term "rotating component" should not be restricted to a shroud assembly.

The rotating component 40 is enclosed or surrounded by a stationary casing 42. The stationary casing 42 is stationary with respect to ground. Accordingly, the stationary casing 42 does not rotate. In the presently contemplated configuration, the stationary casing 42 is an annular body that surrounds the rotating component 40. Furthermore, the rotating component 40 and the stationary casing 42 are separated by a gap or a distance.

The system 10 further includes one or more sensing devices 44, 46. The sensing device 44, 46, for example, may be a laser probe, a radar probe, a microwave probe, a clearance probe, a variable reluctance probe, an eddy current probe, an ultrasonic probe, a dynamic pressure probe, or the like. A number of sensing devices used in the system 10 may depend upon the sensitivity expected from the system 10, and several other factors. The sensing devices 44, 46 are mounted on the stationary casing 42. In the presently contemplated configuration, the sensing devices 44, 46 are mounted on the internal surface of the stationary casing 42. The sensing devices 44, 46, for example, face the outer surface of the rotating component 40. In the presently contemplated configuration, the sensing devices 44, 46 are mounted at an angular distance of 90 degrees. The sensing devices 44, 46 generate raw signals 48, 50 representative of clearances between the rotating component 40 and the stationary casing 42. Particularly, the sensing device 44 generates the signals 48, and the sensing device 46 generates the signals 50.

In one embodiment, the raw signals 48, 50 are representative of clearances between a lower tip of each of the sensing devices 44, 46 and an external surface of the rotating component 40. For example, the signals 48 are representative of clearance d between the lower tip of the sensing device 44 and the external surface of the rotating component 40. It is noted that when the sizes of the sensing devices 44, 46 are negligible, the raw signals 48, 50 are representative of clearances between the rotating component 40 and the stationary casing 42. Particularly, when the sizes of the sensing devices 44, 46 are negligible, the raw signals 48, 50 are representative of the clearances between the external surface of the rotating component 40 and the internal surface of the stationary casing 42. Hereinafter, the phrase "clearances between a rotating component and a stationary casing" shall include "clearances between a lower tip of a sensing device (the sensing device is mounted on a stationary casing surrounding a rotating component) and an external surface of the rotating component."

The system 10 further includes a processing subsystem 52 that is operationally coupled to the sensing devices 44, 46. In one embodiment, the processing subsystem 52, for example, may be in wireless or wired communication with the sensing devices 44, 46. The processing subsystem 52 receives the raw signals 48, 50 from the sensing devices 44, 46. Furthermore, the processing subsystem 52 processes the raw signals 48, 50 to remove noise from the raw signals 48, 50. Furthermore, the processing subsystem 52 processes the raw signals 48, 50 to determine the defects or the potential defects in the rotating component 40. The defects or the potential defects, for example, may include one or more bends in the rotating component 40 or liberation of a piece of the rotating component 40. In one embodiment, the defect or potential defect may include liberation of a piece of one of the shrouds 24, 26, 28, 30.

The processing subsystem 52 processes the raw signals 48, 50 to remove noise from the raw signals 48, 50 to generate processed signals (not shown). Furthermore, the processing subsystem 52 selects a first window of signals and a second window of signals from the raw signals 48, 50. The second window of signals is a subset of the first window of signals. Furthermore, the first window of signals is wider with respect to the second window of signals. Hereinafter, the term "first window of signals" shall be referred to as "wider window of signals". Hereinafter, the term "second window of signals" shall be referred to as "narrower window of signals". Subsequently, the processing subsystem 52 determines a first signed average power value corresponding to the wider window of signals, and a second signed average power value corresponding to the narrower window of signals. The processing subsystem 52 determines a resultant value based upon the first signed average power value and the second signed average power value. Additionally, the processing subsystem 52 determines the defects in the rotating component 40 based upon the resultant value. The determination of the one or more defects or the potential defects in the rotating component shall be explained in greater detail with reference to FIG. 2 and FIG. 3.

Figure 2:
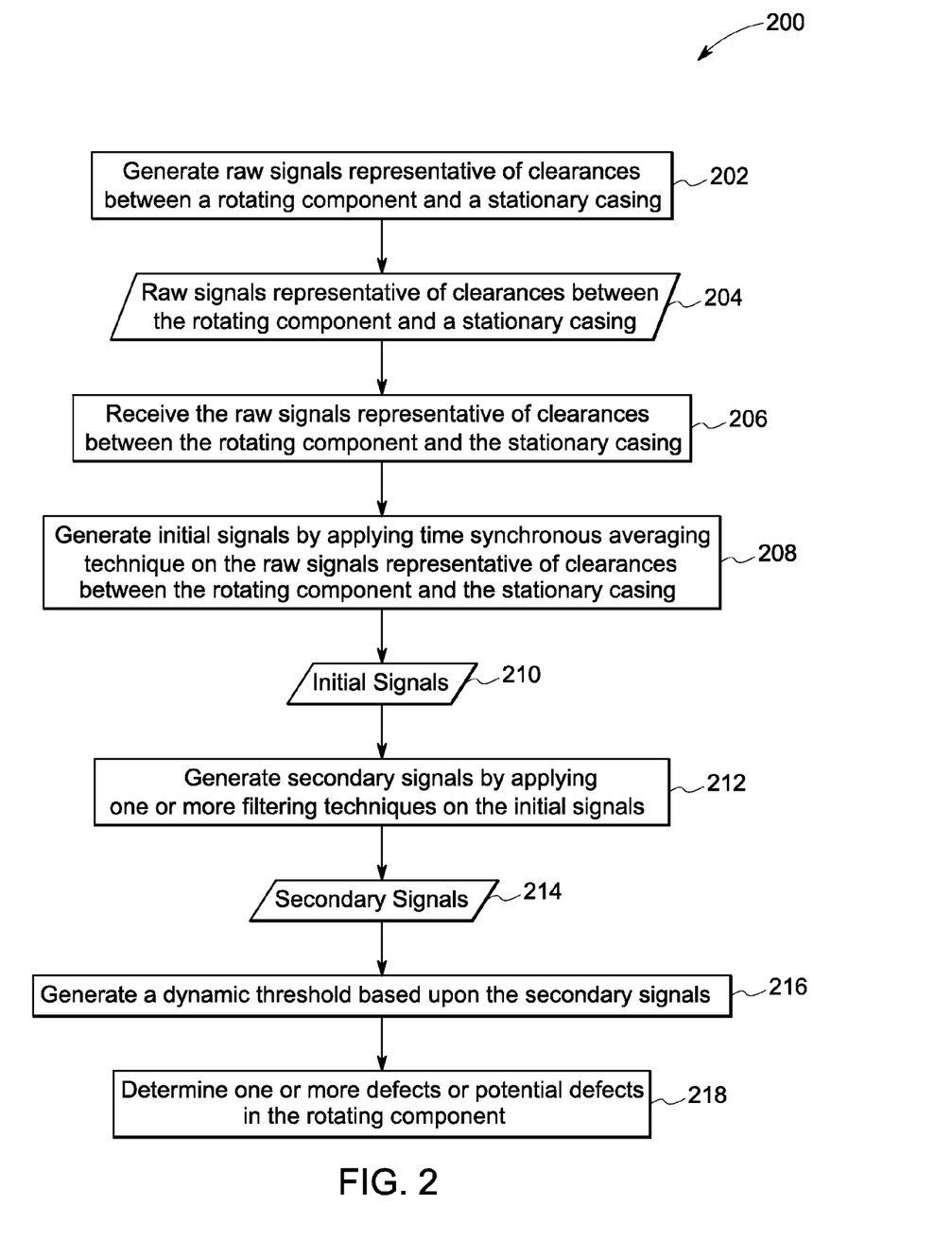
FIG. 2 is a flow chart that illustrates an exemplary method for determination of one or more defects or potential defects in a rotating component, in accordance with certain aspects of the present techniques.

FIG. 2 is a flow chart that illustrates an exemplary method 200 for determination of one or more defects or potential defects in a rotating component, in accordance with certain aspects of the present techniques. At 202, raw signals 204 representative of clearances between the rotating component and a stationary casing are generated. The raw signals 204, for example, may be the raw signals 48, 50. The raw signals 204, for example, may be generated by the sensing devices 44, 46 (see FIG. 1). The rotating component, for example, may be the rotating component 40. The stationary casing, for example, may be the stationary casing 42.

At 206, the raw signals 204 are received by a processing subsystem. The processing subsystem, for example, may be the processing subsystem 52 (see FIG. 1). Furthermore, at 208, initial signals 210 may be generated by applying a time synchronous averaging technique on the raw signals 204. The application of the time synchronous averaging technique on the raw signals 204 removes or averages out asynchronous noise from the raw signals 204 to generate the initial signals 210. The initial signals 210 are representative of the clearances between the rotating component and the stationary casing. Subsequently at 212, secondary signals 214 may be generated by applying one or more filtering techniques on the initial signals 210. The one or more filtering techniques, for example, include a Savitzky-Golay smoothing filter, a Moving average filter, a Weighted moving average filter, a Mean filter, a Median filter, a Weiner filter, a Kalman filter, or the like. The one or more filtering techniques may include other smoothing techniques. The application of the one or more filtering techniques removes noise from the initial signals 210 to generate the secondary signals 214. The secondary signals 214 are again representative of the clearances between the rotating component and the stationary casing.

In this embodiment, at 216, at least one dynamic threshold is generated based upon the secondary signals 214. In one embodiment, the dynamic threshold is generated by determining a median absolute deviation of the secondary signals 214. The dynamic threshold, for example, may be determined using the following equation:

$$DT_i = \text{Median}_j(X_j) \pm 3 \times 1.4826(\text{Median}_i(|X_i - \text{Median}_j(X_j)|)) \quad (1)$$

wherein $DT_i$ is dynamic threshold at a time stamp i, $X_i$ is a data point from the secondary signals 214, or the initial signals 210 or the raw signals 204 generated at the time stamp i, Xj represents a plurality of data points from the secondary signal 214, or the initial signals 210 or the raw signals 204 generated during a time period j, wherein j includes the time stamp i. It is noted that in the presently contemplated configuration, the dynamic threshold is generated using the raw signals 204, initial signals 210, or secondary signals 214 that are used for detection of the defects in the rotating component. Accordingly, in this example the dynamic threshold is not generated using historical signals or data.

At 218, the defects or the potential defects in the rotating component, or potential system failures are determined. In one embodiment, the defects or the potential defects in the rotating component are determined based upon the dynamic threshold and the secondary signals 214. For example, when the secondary signals 214 intersect the dynamic threshold, one or more defects in the rotating component may be determined. In another embodiment, the defects or the potential defects may be determined based upon the initial signals 210 and the dynamic threshold. For example, when the initial signals 210 intersect the dynamic threshold, one or more defects in the rotating component may be determined. In still another embodiment, the defects or the potential defects may be determined based upon the dynamic threshold and the raw signals 204. For example, when the raw signals 204 intersect the dynamic threshold, one or more defects or potential defects in the rotating component may be determined. The determination of the one or more defects or potential defects in the rotating component in accordance with one embodiment is shown with reference to FIG. 3.

Figure 3:
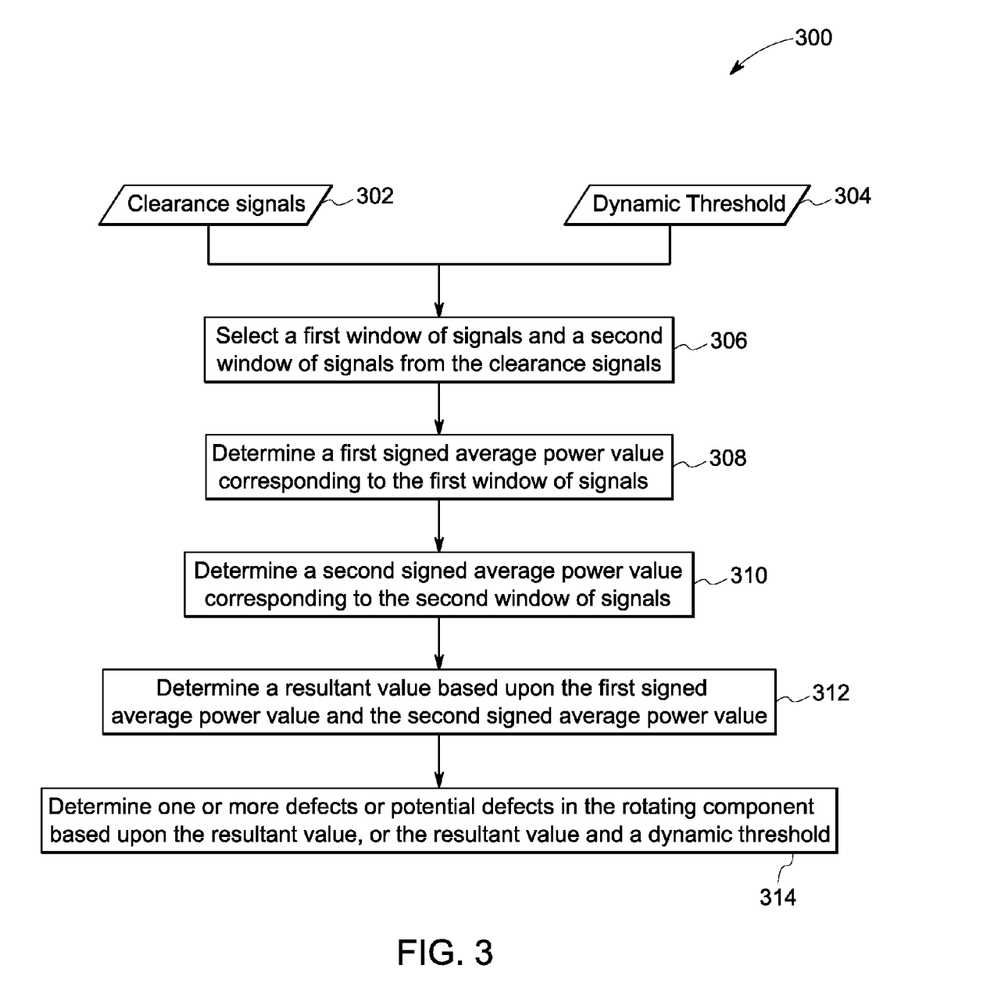
FIG. 3 is a flow chart that illustrates an exemplary method for determination of one or more defects or potential defects in a rotating component, in accordance with certain aspects of the present techniques.

FIG. 3 is a flow chart that illustrates an exemplary method 300 for determination of one or more defects or potential defects in a rotating component, or potential system failures, in accordance with one embodiment of the present techniques. In one embodiment, FIG. 3 explains the determining of one or more defects or the potential defects 218 of FIG. 2 in greater detail. The process commences with clearance signals 302, and dynamic threshold 304. The clearance signals 302, for example may be the raw signals 48, 50 (see FIG. 1), or the raw signals 204 (see FIG. 2) representative of the clearances between the rotating component and the stationary casing. In one embodiment, the clearance signals 302 may be the initial signals 210 (see FIG. 2). In still another embodiment, the clearance signals 302 may be the secondary signals 214 (see FIG. 2). The dynamic threshold 304, for example, may be the dynamic threshold generated at step 216 in FIG. 2.

At 306, a first window of signals and a second window of signals may be selected from the clearance signals 302. The first window of signals and the second window of signals, for example are subsets of the clearance signals 302. The first window of signals, for example, is wider than the second window of signals. Accordingly, the length or time period of the first window of signals is wider with respect to the length or time period of the second window of signals. Hereinafter, the term "first window of signals" shall be referred to as "wider window of signals." Hereinafter, the term "second window of signals" shall be referred to as "narrower window of signals." The narrower window of signals, for example, is a subset of the wider window of signals. In one embodiment, the wider window of signals is representative of a subset of the clearances between the rotating component and the stationary casing during a determined number of rotations of the rotating component. In another embodiment, the wider window of signals is representative of a subset of the clearances between the rotating component and the stationary casing during a single rotation of the rotating component. The wider window of signals, for example may include clearance data that has a length equal to length of data of one rotation of the rotating component. It is noted that a key phasor signal or another similar signal may be used to detect completion of a rotation of the rotating component. Furthermore, the narrower window of signals is representative of a subset of the clearances between a portion of the circumference of the rotating component and the stationary casing. The portion of the circumference of the rotating component, for example, may be equal to the tip length of a blade in a plurality of blades covered by the rotating component. It is noted that while in the presently contemplated configuration, a single narrower window of signals is selected; in certain embodiments, a plurality of narrower windows of signals may be selected. In one embodiment, wherein the narrower windows of signals are selected, one or more of the narrower windows of signals are subsets of the wider window of signals.

Furthermore, at 308, a first signed average power value corresponding to the wider window of signals is determined. The first signed average power value is determined based upon the wider window of signals. At 310 a second signed average power value corresponding to the narrower window of signals is determined. The second signed average power value is determined based upon the narrower window of signals. The first signed average power value and the second signed average power value, for example, may be determined using the following equation:

$$\text{Signed Average Power} = \text{Avg.}(\text{sign}(v(t)) * v^2(t))) \quad (2)$$

wherein v(t) is representative of instantaneous voltage value of the wider window of signals or the narrower window of signals. It is noted that when the plurality of narrower windows of signals are selected, a plurality of second signed average power values are determined.

At 312, a resultant value is determined. In one embodiment, the resultant value is determined based upon the first signed average power value and the second signed average power value. The resultant value, for example, is determined by subtracting the first signed average power value from the second signed average power value, or vice versa. The resultant value, for example, may be determined using the following equation:

$$\text{Resultant Value} = \text{Avg.}(\text{sign}(v(t)|_{w1}) * v^2(t)|_{w1} - \text{Avg.}(\text{sign}(v(t)|_{w2}) * v^2(t)|_{w2} \quad (3)$$

wherein $v(t)|_{w1}$ represents instantaneous voltage values for wider window of signals, and $v(t)|_{w2}$ represents instantaneous voltage values for narrower window of signals. It is noted that when the plurality of second signed average power values are determined, a plurality of resultant values based upon the first signed average power value and the plurality of second signed average power values are determined.

Subsequently at 314, one or more defects or potential defects in the rotating component, or potential system failures are determined. In one embodiment, the defects or potential defects are determined based upon the resultant value. For example, when the resultant value is around zero, it may be determined that there are no defects in the rotating component. In another embodiment, the defects may be determined based upon the resultant value and the dynamic threshold 304. For example, when the dynamic threshold 304 intersects or passes through the resultant value, it may be determined that there are one or more defects in the rotating component.

Figure 4A:
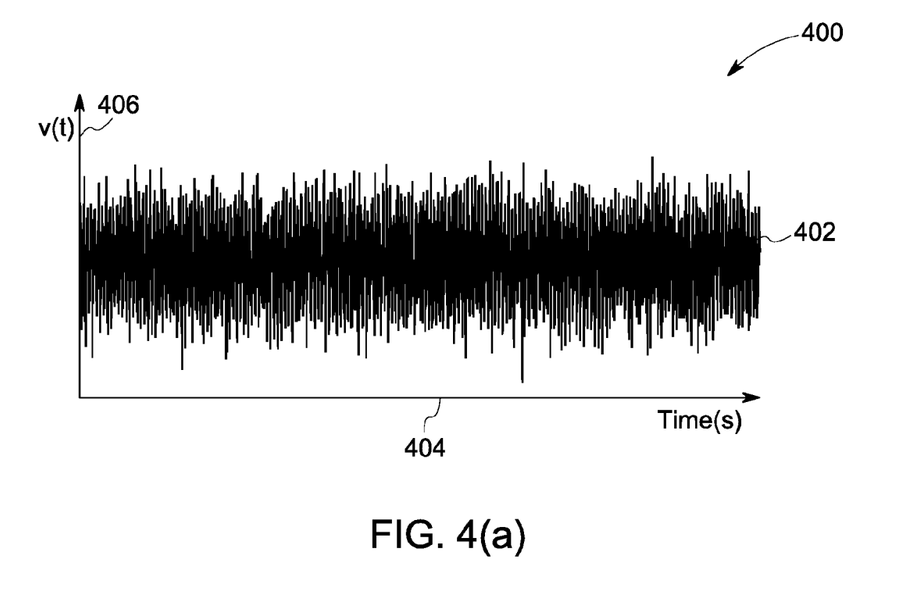

FIG. 4(a) is a graphical representation 400 of a simulated signal 402 representative of clearances between a shroud assembly and a stationary casing surrounding the shroud assembly. The signal 402 is similar to the raw signals 48, 50 referred to in FIG. 1, and the raw signal 204 referred to in FIG. 2. X-axis 404 of the graph 400 represents time stamp, and Y-axis 406 of the graph 400 represents voltage of the signal 402. The signal 402 includes noise. Therefore, a time synchronous averaging technique is applied on the signal 402 to generate an initial signal 408 shown in FIG. 4(b).

Figure 4B:
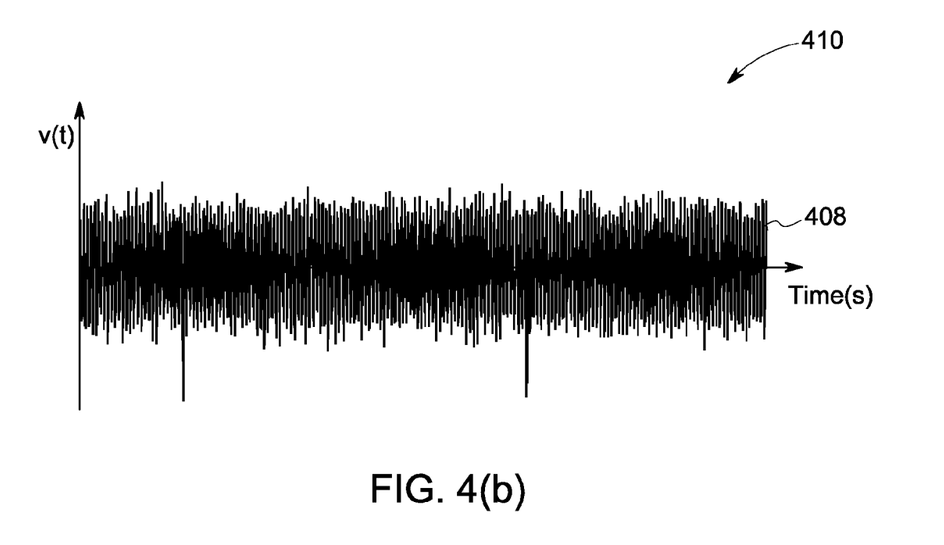

FIG. 4(b) is a graphical representation 410 of the initial signal 408 representative of clearances between the shroud assembly and the stationary casing surrounding the shroud assembly. As is evident from the initial signal 408, the initial signal 408 has less noise in comparison to the signal 402. Furthermore, a Savitzky-Golay-Filter is applied on the initial signal 408 to generate a secondary signal 412 shown in FIG. 4(c). The initial signal 408, for example, may be the initial signals 210 (see FIG. 2).

Figure 4C:
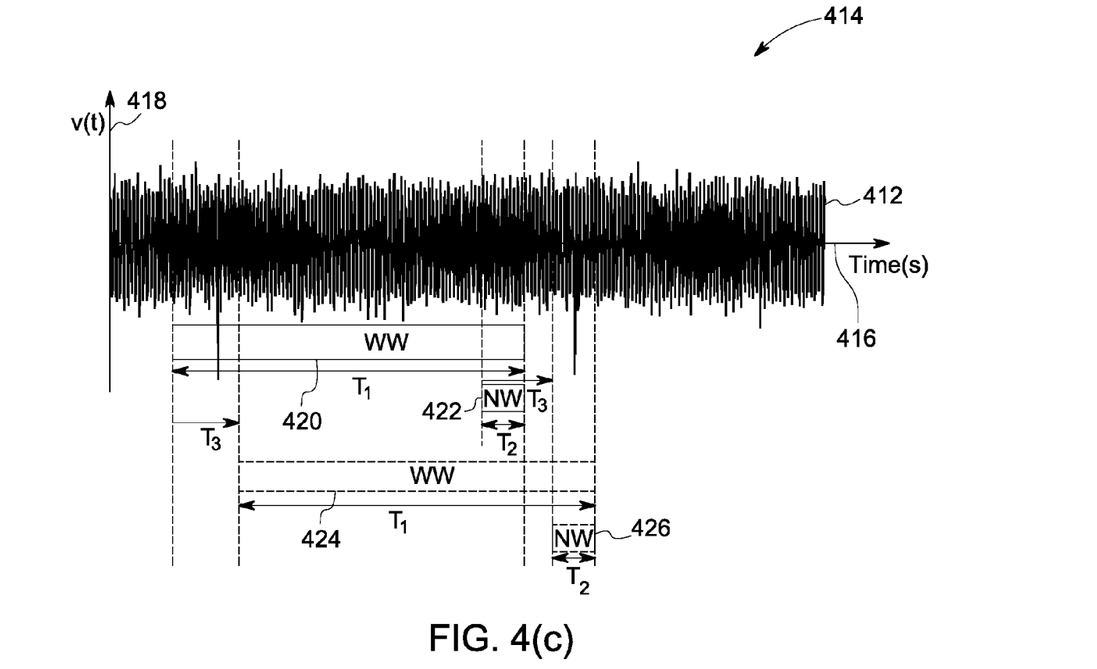

FIG. 4(c) is a graphical representation 414 of the secondary signal 412 representative of clearances between the shroud assembly and the stationary casing surrounding the shroud assembly. The secondary signal 412, for example, is similar to the secondary signal 214 referred to in FIG. 2. X-axis 416 of the secondary signal 412 represents time stamp, and Y-axis 418 of the secondary signal 412 represents voltage of the secondary signal 412. In the presently contemplated configuration, a first window of signals 420 (hereinafter referred to as a wider window of signals) is selected. Particularly, a subset of the secondary signals 412 having a time period length $T_1$ is selected. The time period length $T_1$, for example, is equal to a length of clearance signals generated during a rotation of the rotating component. Furthermore, a second window of signals 422 (hereinafter referred to as a narrower window of signals) is selected. Particularly, a subset of the secondary signals 412 having a time period length $T_2$ is selected. As shown in FIG. 4(c), the time period length $T_2$ is less than the time period length $T_1$. Accordingly, the time period length $T_1$ of the wider window of signals 420 is greater than the time period length $T_2$ of the narrower window of the signals 422. As is shown in FIG. 4(c), the narrower window of signals 422 is a subset of the wider window of signals 420. A first signed average power value corresponding to the wider window of signals 420 is determined, and a second signed average power value corresponding to the narrower window of signals 422 is determined. In the presently contemplated configuration, a first resultant value (not shown) is determined based upon the first signed average power value and the second signed average power value.

Furthermore, the wider window of signals 420 is shifted/moved by a determined time period $T_3$. For ease of understanding the shifted wider window of signals is referred to by the reference numeral 424. In this embodiment, the shifting or movement of the wider window of signals 420 includes selection of a different subset of signals having a time period length similar to a time period length of a previous wider window of signals. For example, the time period length of the wider window of signals 420 and the shifted wider window of signals 424 is $T_1$. Furthermore, the narrower window of signals 422 is shifted/moved by the time period $T_3$. For ease of understanding, the shifted narrower window of signals is referred to by the reference numeral 426. A subsequent first signed average power value corresponding to the shifted wider window of signals 424 and a subsequent second signed average power value corresponding to the shifted narrower window of signals 426 is determined. Furthermore, a subsequent resultant value is determined based upon the subsequent first signed average power value corresponding to the shifted wider window of signals 424 and the subsequent second signed average power value corresponding to the shifted narrower window of signals 426.

Subsequently, the shifted wider window of signals 424 and the shifted narrower window of signals 426 are repeatedly shifted. The process of shifting wider window of signals and narrower window of signals is repeated multiple times to determine subsequent first signed average power values corresponding to shifted wider windows of signals and subsequent second signed average power values corresponding to shifted narrower windows of signals. Furthermore, subsequent resultant values corresponding to the shifted wider windows of signals and the shifted narrower windows of signals are determined. The subsequent resultant values, for example are determined based upon the subsequent first signed average power values and the subsequent second signed average power values. A subsequent resultant value is determined based upon respective subsequent first signed average power value and a respective subsequent second signed average power value. The subsequent resultant values, including the first resultant value, for example, are mapped on a graph to generate a resultant value signal 426. The resultant value signal 426 that is generated using the first resultant value and the subsequent resultant values is shown in FIG. 4(d).

Figure 4D:
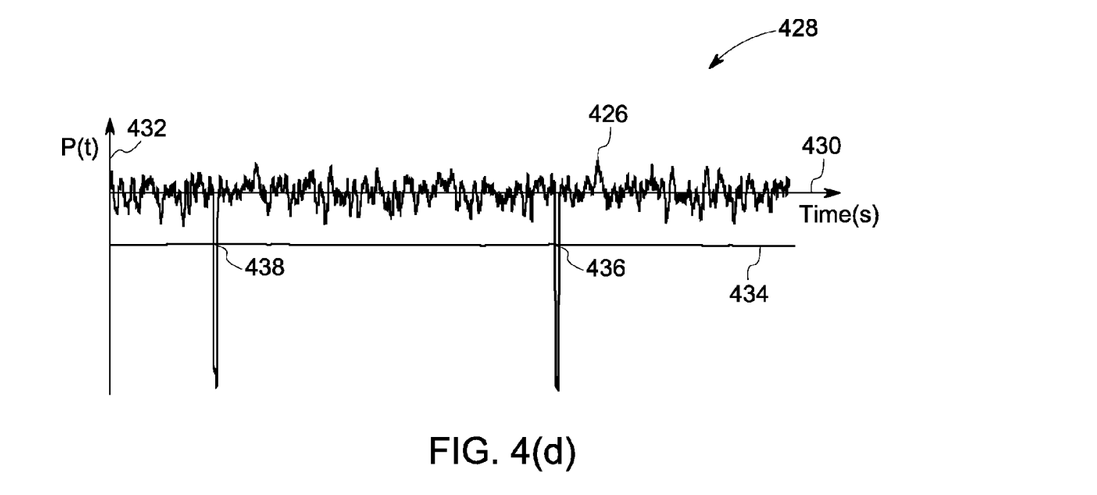

Referring now to FIG. 4(d), a graphical representation 428 of the resultant value signal 426 is shown. X-axis 430 of the graph 428 is representative of time stamp, and Y-axis 432 of the graph 428 is representative of power of the resultant value signal 426. Furthermore, reference numeral 434 is representative of a dynamic threshold. In the presently contemplated configuration, the dynamic threshold 434 is generated by determining a median absolute deviation of the resultant value signal 426. As shown in FIG. 4(d), the dynamic threshold 434 intersects the resultant value signal 426 at a first point 436, and a second point 438, therefore, one or more defects or potential defects in the rotating component, or potential system failures may be defined.

Figure 5A:
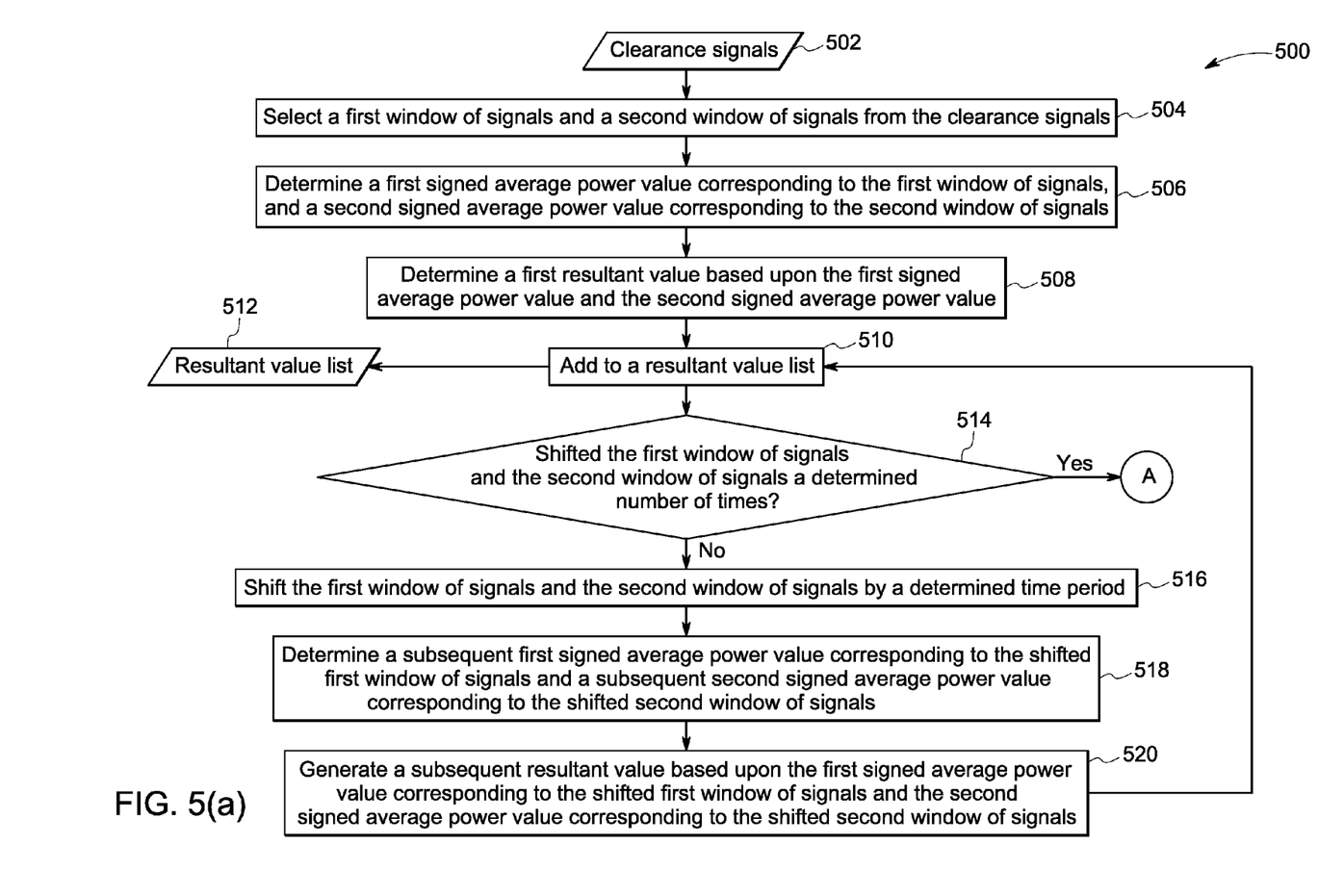
Figure 5B:
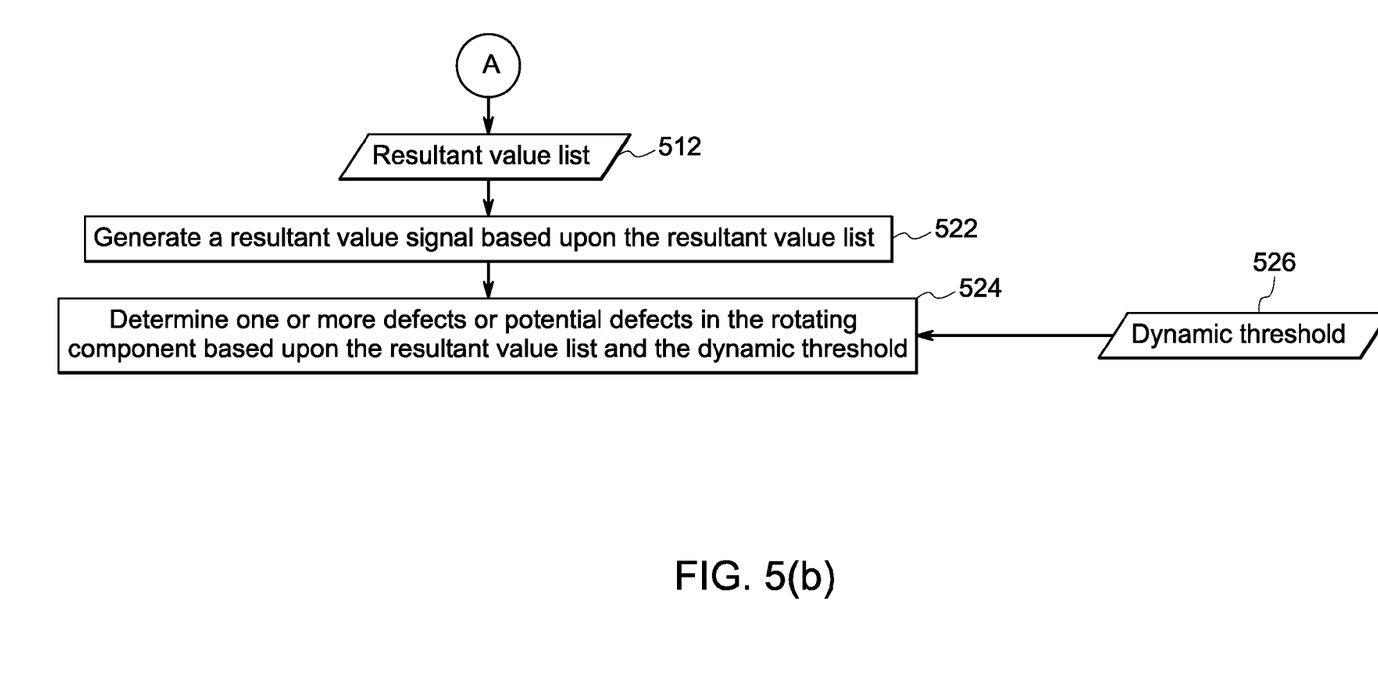

FIG. 5(a) and FIG. 5(b) is a flow chart that illustrates an exemplary method 500 for determination of one or more defects or potential defects in a rotating component, or potential system failures, in accordance with another embodiment of the present techniques. In one embodiment, FIG. 5 explains the determining of the one or more defects or the potential defects 218 of FIG. 2 in greater detail. Clearance signals 502, for example may be the raw signals 204 representative of clearances between the rotating component and the stationary casing (see FIG. 2). In one embodiment, the clearance signals 502 may be the initial signals 210 (see FIG. 2). In still another embodiment, the clearance signals 502 may be the secondary signals 214 (see FIG. 2). In still another embodiment, the clearance signals 502 may be the clearance signals 302 (see FIG. 3, or the raw signals 48, 50 (see FIG. 2).

At 504, a first window of signals and a second window of signals may be selected from the clearance signals 502. At 506, a first signed average power value corresponding to the first window of signals and a second signed average power value corresponding to the second window of signals are determined. Subsequently at 508, a first resultant value based upon the first signed average power value corresponding to the first window of signals and the second signed average power value corresponding to the second window of signals is determined. As previously noted, the first resultant value is determined by subtracting the second signed average power value corresponding to the second window of signals from the first signed average power value corresponding to the first window of signals. At 510, the first resultant value is added to a resultant value list 512. Furthermore, at 514, a check is carried out to determine whether the first window of signals and the second window of signals have been shifted/moved for a determined number of times. At 514, when it is determined that the first window of signals and the second window of signals have not been shifted for the determined number of times, the control is transferred 516. At 516, the first window of signals and the second window of signals are shifted by a determined time period. The first window of signals and the second window of signals, for example may be shifted in a similar manner as is described with reference to FIG. 4(c).

At 518, a subsequent first signed average power value corresponding to the shifted first window of signals, and a subsequent second signed average power value corresponding to the shifted second window of signals may be determined. Subsequently at 520, a subsequent resultant value based upon the subsequent first signed average power value corresponding to the shifted first window of signals and the subsequent second signed average power value corresponding to the shifted second window of signals are determined. Subsequently at 510, the subsequent resultant value is added to the resultant value list 512. Further, the control is transferred to the 514. Again at 514, a check is carried out to determine whether the first window of signals and the second window of signals have been shifted for the determined number of times. Accordingly, 516-520 and 510 are iterated the determined number of times till the first window of signals and the second window of signals have been shifted for the determined number of times. Accordingly due to multiple iterations of the 516-520 and 510, the resultant value list 512 includes multiple resultant values including the first resultant value and the subsequent resultant value.

At 514, when it is determined that the first window of signals and the second window of signals have been shifted for the determined number of times, the control is transferred 522. Referring now to FIG. 5(b), at 522, a resultant value signal is generated using the resultant value list 512. Particularly, the resultant value signal is generated by using the multiple resultant values in the resultant value list 512. The resultant value signal, for example, is similar to the resultant value signal 426 shown in FIG. 4(d). Subsequently at 524, the defects or the potential defects in the rotating component, or system failures may be determined based upon the resultant value signal and a dynamic threshold 526. In the presently contemplated configuration, the dynamic threshold 526, for example, is generated by determining a median absolute deviation of the resultant value signal. In certain embodiments, the dynamic threshold 526, may be generated by determining a median absolute deviation of the clearance signals 502. The dynamic threshold 526, for example may be similar to the dynamic threshold 434 (see FIG. 4(d) or the dynamic threshold generated at 216 in FIG. 2. It is noted that while FIG. 5(a) and FIG. 5(b) show the exemplary method 500 wherein the method ends at 524, however, the method 500 may be continuously executed during operation of the rotating component. Accordingly, the method 500 may be continuously executed to monitor the one or more defects, the potential defects in the rotating component or system failures in real-time.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising
receiving clearance signals representative of clearances between a rotating component and a stationary casing surrounding the rotating component from at least one sensing device;
selecting a first window of signals and a second window of signals from the clearance signals;
determining a first signed average power value corresponding to the first window of signals, and a second signed average power value corresponding to the second window of signals, wherein the first signed average power value is an average of products of sign of instantaneous voltage values of the first window of signals and squares of the instantaneous voltage values of the first window of signals and wherein the second signed average power value is an average of products of sign of instantaneous voltage values of the second window of signals and squares of the instantaneous voltage values of the second window of signals;
determining a resultant value based upon the first signed average power value and the second signed average power value;
determining one or more defects or potential defects in the rotating component based upon the resultant value; and
planning maintenance of the rotating component based on the determined one or more defects or the potential defects.

2. The method of claim 1, wherein the second window of signals is a subset of the first window of signals.

3. The method of claim 1, wherein the first window of signals and the second window of signals are subsets of the clearance signals.

4. The method of claim 1, wherein the first window of signals is representative of a subset of the clearances between the rotating component and the stationary casing during a single rotation of the rotating component.

5. The method of claim 1, wherein the first window of signals is representative of a subset of the clearances between the rotating component and the stationary casing during a determined number of rotations of the rotating component.

6. The method of claim 1, wherein the second window of signals is representative of a subset of the clearances between a portion of the circumference of the rotating component and the stationary casing.

7. The method of claim 1, further comprising generating a dynamic threshold based upon the clearance signals.

8. The method of claim 7, wherein generating the dynamic threshold comprises determining a median absolute deviation of the clearance signals.

9. The method of claim 7, further comprising determining the one or more defects based upon the resultant value and the dynamic threshold.

10. A method, comprising
receiving raw signals representative of clearances between a rotating component and a stationary casing surrounding the rotating component from at least one sensing device;
generating initial signals by applying a time synchronous averaging technique to the raw signals; and
generating clearance signals by applying a smoothing filter to the initial signals;
selecting a first window of signals and a second window of signals from the clearance signals;
determining a first signed average power value corresponding to the first window of signals and a second signed average power value corresponding to the second window of signals;
determining a resultant value based upon the first signed average power value and the second signed average power value;
determining one or more defects or potential defects in the rotating component based upon the resultant value; and
planning maintenance of the rotating component based on the determined one or more defects or the potential defects.

11. The method of claim 1, further comprising:
iteratively shifting the first window of signals and the second window of signals to determine subsequent first signed average power values and subsequent second signed average power values;
determining a plurality of subsequent resultant values based upon the subsequent first signed average power values and the subsequent second signed average power values;
generating a resultant value signal based upon the resultant value and the plurality of subsequent resultant values; and
determining one or more defects or potential defects in the rotating component based upon the resultant value signal.

12. The method of claim 1, wherein the resultant value is a difference between the first signed average power value and the second signed average power value.

13. A method, comprising
receiving clearance signals representative of clearances between a rotating component and a stationary casing surrounding the rotating component from at least one sensing device;
selecting a first window of signals and a second window of signals from the clearance signals;
determining a first signed average power value corresponding to the first window of signals, and a second signed average power value corresponding to the second window of signals;
determining a first resultant value based upon the first signed average power value and the second signed average power value;
iteratively shifting the first window of signals and the second window of signals to determine subsequent first signed average power values and subsequent second signed average power values;
determining a plurality of subsequent resultant values based upon the subsequent first signed average power values and the subsequent second signed average power values;
generating a resultant value signal based upon the first resultant value and the plurality of subsequent resultant values;
determining one or more defects or potential defects in the rotating component based upon the resultant value signal; and
planning maintenance of the rotating component based on the determined one or more defects or the potential defects.

14. The method of claim 13, wherein determining the one or more defects or the potential defects in the rotating component further comprises determining the one or more defects or the potential defects in the rotating component based upon the resultant value and a dynamic threshold.

15. The method of claim 14, further comprising determining the dynamic threshold by determining a median absolute deviation of the resultant value signal.

16. A method, comprising:
receiving clearance signals representative of clearances between a rotating component and a stationary casing surrounding the rotating component from at least one sensing device;
selecting a wider window of signals and a narrower window of signals from the clearance signals;
determining a first signed average power value corresponding to the wider window of signals, and a second signed average power value corresponding to the narrower window of signals;
determining a first resultant value based upon the first signed average power value and the second signed average power value;
iteratively shifting the wider window of signals and the narrower window of signals to determine subsequent first signed average power values and subsequent second signed average power values;
determining a plurality of subsequent resultant values based upon the subsequent first signed average power values and the subsequent second signed average power values;
generating a resultant value signal based upon the first resultant value and the plurality of subsequent resultant values;
generating a dynamic threshold by determining a median absolute deviation of the resultant value signal;
determining one or more defects or potential defects in the rotating component based upon the resultant value signal and the dynamic threshold; and
planning maintenance of the rotating component based on the determined one or more defects or the potential defects.

17. A system, comprising:
at least one sensing device configured to generate clearance signals representative of clearances between a rotating component and a stationary casing surrounding the rotating component;
a processing subsystem that:
receives the clearance signals from the at least one sensing device;
selects a first window of signals and a second window of signals from the clearance signals;
determines a first signed average power value corresponding to the first window of signals, and a second signed average power value corresponding to the second window of signals, wherein the first signed average power value is an average of products of sign of instantaneous voltage values of the first window of signals and squares of the instantaneous voltage values of the first window of signals and wherein the second signed average power value is an average of products of sign of instantaneous voltage values of the second window of signals and squares of the instantaneous voltage values of the second window of signals;
determines a resultant value based upon the first signed average power value and the second signed average power value;
determines one or more defects or potential defects in the rotating component based upon the resultant value; and
plans maintenance of the rotating component based on the determined one or more defects or the potential defects.

18. The system of claim 17, wherein the rotating component is a shroud assembly, and a plurality of shrouds mutually engage to form an uneven continuous external surface of the rotating component.

19. The system of claim 17, wherein the clearance signals comprise noise.

20. The system of claim 19, wherein the processing subsystem processes the clearance signals to remove the noise from the clearance signals.

21. The system of claim 19, wherein the at least one sensing device comprises a laser probe, a radar probe, a microwave probe, a clearance probe, a variable reluctance probe, an eddy current probe, an ultrasonic probe, a dynamic pressure probe, or combinations thereof.

* * * * *